(12) United States Patent
Lilley et al.

(10) Patent No.: US 11,939,726 B2
(45) Date of Patent: Mar. 26, 2024

(54) RESILIENT, MULTI-LAYERED WIPING PRODUCT

(71) Applicant: Kimberly-Clark Worldwide, Inc., Neenah, WI (US)

(72) Inventors: David A. Lilley, Salem, SC (US); Donald E. Waldroup, Roswell, GA (US); Charles W. Colman, Marietta, GA (US); Joseph K. Baker, Cumming, GA (US); Marvin E. Swails, Alpharetta, GA (US); Michael Payne, Acworth, GA (US); Vicky S. Polashock, Roswell, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 213 days.

(21) Appl. No.: 17/418,289

(22) PCT Filed: Dec. 28, 2018

(86) PCT No.: PCT/US2018/067895
§ 371 (c)(1),
(2) Date: Jun. 25, 2021

(87) PCT Pub. No.: WO2020/139374
PCT Pub. Date: Jul. 2, 2020

(65) Prior Publication Data
US 2022/0090328 A1 Mar. 24, 2022

(51) Int. Cl.
*D21H 27/38* (2006.01)
*B32B 5/02* (2006.01)
(Continued)

(52) U.S. Cl.
CPC ............ *D21H 27/38* (2013.01); *D04H 1/425* (2013.01); *D04H 1/559* (2013.01); *D04H 1/68* (2013.01);
(Continued)

(58) Field of Classification Search
CPC ........ D21H 27/38; D21H 27/05; D21H 27/30; D21H 27/34; B32B 5/022; B32B 5/08;
(Continued)

(56) References Cited

U.S. PATENT DOCUMENTS

| 3,716,449 A | * | 2/1973 | Gatward | ............... | D21F 11/002 |
| | | | | | 162/190 |
| 3,837,999 A | * | 9/1974 | Chung | ................. | D21F 11/002 |
| | | | | | 162/101 |

(Continued)

FOREIGN PATENT DOCUMENTS

| CN | 1233210 A | 10/1999 |
| CN | 101087552 A | 12/2007 |

(Continued)

OTHER PUBLICATIONS

International Search Report for PCT/US2018/067895 dated Sep. 23, 2019, 6 pages.

(Continued)

*Primary Examiner* — Jose A Fortuna
(74) *Attorney, Agent, or Firm* — Dority & Manning, P.A.

(57) ABSTRACT

A multi-layered web is disclosed that is resilient and/or elastic in the Z-direction. Thus, when the web is compressed, the web assumes a compacted state and then expands to an expanded state when the compressive forces are removed. In one embodiment, the multi-layered web includes a middle layer made from a resilient blend of fibers positioned inbetween two outer layers. The middle layer, for (Continued)

instance, can contain elastomeric fibers, three-dimensional fibers, and/or debonded fibers.

18 Claims, 1 Drawing Sheet

(51) Int. Cl.
| | |
|---|---|
| B32B 5/08 | (2006.01) |
| B32B 29/02 | (2006.01) |
| D04H 1/425 | (2012.01) |
| D04H 1/559 | (2012.01) |
| D04H 1/68 | (2012.01) |
| D21F 11/00 | (2006.01) |
| D21H 27/00 | (2006.01) |

(52) U.S. Cl.
CPC ......... *D21F 11/002* (2013.01); *D21H 27/005* (2013.01); *B32B 5/022* (2013.01); *B32B 5/08* (2013.01); *B32B 29/02* (2013.01); *B32B 2250/03* (2013.01); *B32B 2250/40* (2013.01); *B32B 2262/0207* (2013.01); *B32B 2262/062* (2013.01); *B32B 2262/12* (2013.01); *B32B 2307/718* (2013.01); *B32B 2307/726* (2013.01); *B32B 2432/00* (2013.01); *B32B 2555/00* (2013.01); *D10B 2401/061* (2013.01)

(58) Field of Classification Search
CPC . B32B 29/02; B32B 2250/03; B32B 2250/40; B32B 2262/0207; B32B 2262/062; B32B 2262/12; B32B 2307/718; B32B 2307/726; B32B 2432/00; B32B 2555/00; D04H 1/425; D04H 1/559; D04H 1/68; D04H 1/43918; D04H 5/06; D10B 2401/061
See application file for complete search history.

(56) References Cited

U.S. PATENT DOCUMENTS

| | | | | |
|---|---|---|---|---|
| 3,871,952 | A * | 3/1975 | Robertson | D21F 11/002 |
| | | | | 162/190 |
| 3,938,782 | A * | 2/1976 | Robertson | D21F 11/002 |
| | | | | 366/181.8 |
| 4,885,202 | A | 12/1989 | Lloyd et al. | |
| 5,190,563 | A * | 3/1993 | Herron | D06M 13/192 |
| | | | | 8/129 |
| 5,284,703 | A | 2/1994 | Everhart et al. | |
| 5,458,963 | A * | 10/1995 | Meirowitz | A61F 13/53708 |
| | | | | 428/221 |
| 5,549,791 | A * | 8/1996 | Herron | D06M 14/04 |
| | | | | 162/158 |
| 5,562,740 | A * | 10/1996 | Cook | D06M 11/50 |
| | | | | 8/111 |
| 5,772,845 | A * | 6/1998 | Farrington, Jr. | D21F 11/14 |
| | | | | 162/111 |
| 6,231,721 | B1 | 5/2001 | Quick et al. | |
| 6,780,201 | B2 * | 8/2004 | Sun | D06M 15/263 |
| | | | | 8/120 |
| 6,861,380 | B2 * | 3/2005 | Garnier | D21H 27/38 |
| | | | | 442/364 |
| 8,277,606 | B2 * | 10/2012 | Lee | D21H 11/16 |
| | | | | 162/13 |
| 9,809,931 | B2 * | 11/2017 | Zwick | D21H 11/00 |
| 9,896,805 | B2 * | 2/2018 | Timm | D21H 27/40 |
| 10,024,000 | B2 | 7/2018 | Barnholtz et al. | |
| 10,273,635 | B2 * | 4/2019 | Miller, IV | D21H 21/28 |
| 10,487,454 | B2 * | 11/2019 | Lindsay | D21H 21/14 |
| 10,519,606 | B2 * | 12/2019 | Swails | D21H 27/002 |
| 10,900,176 | B2 * | 1/2021 | Miller, IV | D21H 21/24 |
| 11,091,879 | B2 * | 8/2021 | Swails | D21H 21/56 |
| 11,255,051 | B2 * | 2/2022 | Calewarts | D21H 15/04 |
| 11,332,889 | B2 * | 5/2022 | Sealey, II | D04H 1/4282 |
| 11,346,056 | B2 * | 5/2022 | Barnholtz | D21H 27/002 |
| 11,391,000 | B2 * | 7/2022 | Ramaratnam | B32B 29/02 |
| 11,406,730 | B2 * | 8/2022 | Nseir Manassa | A61L 15/42 |
| 2001/0018308 | A1 | 8/2001 | Quick et al. | |
| 2001/0040015 | A1 * | 11/2001 | Lee | D21C 9/007 |
| | | | | 162/68 |
| 2010/0003449 | A1 * | 1/2010 | Turner | B32B 5/08 |
| | | | | 428/86 |
| 2010/0203306 | A1 | 8/2010 | Fingal et al. | |
| 2013/0037481 | A1 | 2/2013 | Lalouch et al. | |
| 2014/0189970 | A1 * | 7/2014 | Fingal | D04H 1/435 |
| | | | | 162/135 |
| 2015/0114581 | A1 * | 4/2015 | Kinnunen | D21F 11/002 |
| | | | | 162/158 |
| 2015/0330029 | A1 * | 11/2015 | Ramaratnam | A47L 13/17 |
| | | | | 162/111 |
| 2016/0145810 | A1 * | 5/2016 | Miller, IV | D21H 27/005 |
| | | | | 162/111 |
| 2016/0319470 | A1 | 11/2016 | Jenkins et al. | |
| 2017/0079856 | A1 | 3/2017 | Kimura et al. | |
| 2017/0204568 | A1 * | 7/2017 | Timm | D21H 25/005 |
| 2017/0303762 | A1 * | 10/2017 | Baker | A47L 13/16 |
| 2018/0313038 | A1 * | 11/2018 | Bradbury | D21H 21/22 |
| 2019/0136457 | A1 * | 5/2019 | Lindsay | D21H 21/20 |
| 2019/0316298 | A1 * | 10/2019 | Miller | D21H 21/22 |
| 2020/0078488 | A1 * | 3/2020 | Nseir Manassa | A61L 15/42 |
| 2021/0095426 | A1 * | 4/2021 | Miller, IV | D21H 21/28 |
| 2021/0102337 | A1 * | 4/2021 | Drolet | D21C 9/007 |
| 2021/0164168 | A1 * | 6/2021 | Miller, IV | D21H 17/28 |
| 2022/0090328 | A1 * | 3/2022 | Lilley | D21H 27/30 |
| 2022/0170192 | A1 * | 6/2022 | Hanley | D21H 25/06 |
| 2022/0370684 | A1 * | 11/2022 | Nseir Manassa | A61L 27/34 |
| 2023/0077220 | A1 * | 3/2023 | Börjesson | D04H 1/43918 |
| 2023/0250586 | A1 * | 8/2023 | Colman | D21F 11/04 |
| | | | | 162/129 |

FOREIGN PATENT DOCUMENTS

| | | | | |
|---|---|---|---|---|
| CN | 113383121 A | * | 9/2021 | ............. B32B 29/02 |
| EP | 765416 B1 | * | 7/1998 | ............. A61L 15/24 |
| EP | 1697122 B1 | * | 12/2012 | ............. A47L 13/16 |
| EP | 3752428 B1 | * | 12/2021 | ............. B65B 11/50 |
| GB | 2565725 B | * | 11/2021 | ............. A47K 10/16 |
| JP | 2007321292 A | | 12/2007 | |
| WO | WO98/03713 A1 | | 1/1998 | |
| WO | WO-2017209739 A1 | * | 12/2017 | ............. A47K 10/16 |

OTHER PUBLICATIONS

Colombian Office Action Corresponding to Application No. NC2021/0009814 dated Jan. 2, 2023.
Chinese Office Action Corresponding to Application No. 201880099848 dated Aug. 25, 2022.
European Search Report Corresponding to Application No. 18944139 dated Jul. 1, 2022.
Korean Office Action Corresponding to Application No. 10-2021-7023419 dated Apr. 7, 2023.

\* cited by examiner

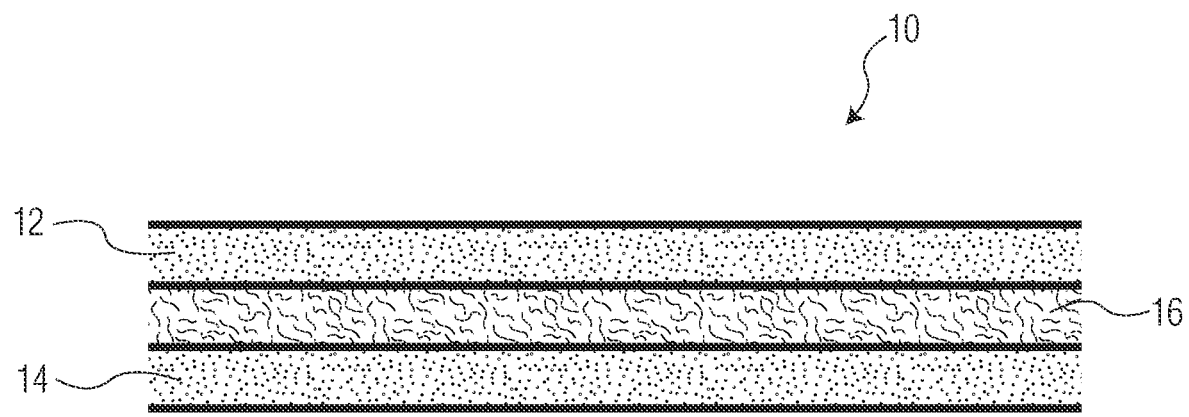

RESILIENT, MULTI-LAYERED WIPING PRODUCT

BACKGROUND

Many tissue products, such as facial tissue, bath tissue, paper towels, industrial wipers, and the like, are produced according to a wet laid process. Wet laid webs are made by depositing an aqueous suspension of pulp fibers onto a forming fabric and then removing water from the newly-formed web. Water is typically removed from the web by mechanically pressing water out of the web which is referred to as "wet-pressing". Although wet-pressing is an effective dewatering process, during the process the tissue web is compressed causing a marked reduction in the caliper of the web and in the bulk of the web.

For most applications, however, it is desirable to provide the final product with as much bulk as possible without compromising other product attributes. Thus, those skilled in the art have devised various processes and techniques in order to increase the bulk of wet laid webs. For example, creping is often used to disrupt paper bonds and increase the bulk of tissue webs. During a creping process, a tissue web is adhered to a heated cylinder and then creped from the cylinder using a creping blade.

Another process used to increase web bulk is known as "rush transfer". During a rush transfer process, a web is transferred from a first moving fabric to a second moving fabric in which the second fabric is moving at a slower speed than the first fabric. Rush transfer processes increase the bulk, caliper and softness of the tissue web.

As an alternative to wet-pressing processes, through-drying processes have developed in which web compression is avoided as much as possible in order to preserve and enhance the bulk of the web. These processes provide for supporting the web on a coarse mesh fabric while heated air is passed through the web to remove moisture and dry the web.

Although various improvements have been made to wet laid processes for increasing the bulk and absorbency of tissue webs, the wet laid process still has various drawbacks. For example, wet laid webs are limited in their ability to be resilient to compressive forces. For example, many tissue products are wound into rolls prior to use. The tension placed on the web during winding can cause the web to compress and lose a significant amount of bulk that is not recovered when the web is unwound. Consequently, either the web is wound tightly causing a decrease in various important properties or the web is wound under little to no tension which is not only inefficient but also produces bulky products that are limited in the number of sheets they contain and are somewhat difficult to handle and package.

SUMMARY

In view of the above, a need currently exists for a wiping product or tissue product that is resilient to compressive forces. The present disclosure is generally directed to a multi-layered wiping product that is imparted with Z-direction resiliency such that the wiping product recovers after being compressed. For example, the wiping product of the present disclosure can be tightly wound into a roll causing the product to decrease in thickness. When the wiping product is unwound, however, the product expands and increases in thickness, thereby increasing water absorbency and having an improved feel. The present disclosure is also directed to a process for producing the wiping product.

In one embodiment, for instance, the present disclosure is directed to an absorbent, multi-layered web including a first layer comprising pulp fibers and a second layer also comprising pulp fibers. A middle layer is positioned inbetween the first layer and the second layer and comprises a resilient fibrous layer. The resilient fibrous layer comprises elastomeric fibers, three-dimensional fibers, debonded cellulosic fibers, or mixtures thereof. As opposed to being formed through a wet lay process, the multi-layered web of the present disclosure can be formed according to various other processes that allow for the formation of distinct layers and allow for the processing and formation of a resilient middle layer. For example, in one embodiment, the multi-layered web is a multi-phase formed web. For example, the fibers used to form the web can be suspended within a gas and liquid foam during formation of the web. Alternatively, the web can be formed using alternative techniques, such as air forming.

The middle, resilient fibrous layer is formed from fibers and positioned within the web such that the web is capable of expanding back to its original thickness after being compressed in the Z-direction. For example, when the web is subjected to a compressive force of 13 kPa and the compressive force is then removed, the web increases in thickness in an amount of at least about 5%, such as in an amount of at least about 8%, such as in an amount of at least about 10%. When the compressive force is removed, the web also increases in bulk in an amount of at least about 5%, such as in an amount of at least about 8%, such as in an amount of at least about 10%.

In one embodiment, the middle, resilient fibrous layer of the multi-layer web can be made from elastomeric fibers. The elastomeric fibers can be formed from an elastomeric polymer, such as a styrenic block copolymer, a thermoplastic polyurethane elastomer, a polyamide elastomer, a copolyester elastomer, a metallocene catalyzed polyolefin elastomer, or a silicone elastomer. Alternatively, the resilient, fibrous layer can be formed from three-dimensional fibers which can include crimped fibers, curled fibers, or mixtures thereof. In one embodiment, the three-dimensional fibers can comprise curled fibers having a curl index of greater than about 0.15, such as greater than about 0.2. The three-dimensional fibers may comprise pulp fibers or synthetic fibers. In one embodiment, the three-dimensional fibers comprise synthetic bi-component fibers. In one embodiment, the three-dimensional fibers are helically-shaped fibers.

In still another embodiment, the resilient, middle layer comprises debonded cellulosic fibers. For example, the debonded cellulosic fibers can comprise alpha cellulose fibers and/or cellulose fibers treated with a debonding agent.

The middle, resilient layer of the multi-layered web can generally comprise from about 10% by weight to about 60% by weight of the web, such as from about 10% by weight to about 35% by weight of the web. In one embodiment, the fibers contained in the middle layer can have a different fiber orientation than the fibers contained in the first layer and the second layer. For example, the fibers contained in the middle layer can be primarily oriented in the cross direction while the fibers contained in the first layer and the second layer can be primarily oriented in the machine direction.

In one embodiment, at least one side of the web has been creped. For example, an adhesive can be applied to one or both sides of the web and the web can be creped from a creping surface.

Multi-layered webs made according to the present disclosure can generally have a basis weight of greater than about 10 gsm, such as greater than about 15 gsm, such as greater than about 20 gsm and generally less than about 150 gsm, such as less than about 120 gsm, such as less than about 100 gsm, such as less than about 80 gsm, such as less than about 60 gsm, such as less than about 45 gsm. The resilient, middle layer can generally comprise greater than about 10% by weight of the web, such as greater than about 20% by weight of the web, such as greater than about 30% by weight of the web and generally less than about 60% by weight of the web, such as less than about 50% by weight of the web, such as less than about 40% by weight of the web, such as less than about 35% by weight of the web.

As described above, the first layer and the second layer generally contain pulp fibers. In addition to pulp fibers, each layer can contain synthetic fibers. For example, the first and second layers can contain recycled fibers, recovered textile fibers, other plant-based fibers, and mixtures thereof. The first layer can comprise a top surface layer of the final product and the second layer can comprise a bottom surface layer of the final product. For instance, the final product can comprise a single ply article.

The present disclosure is also directed to a spirally wound product comprising the absorbent, multi-layered web as described above. The multi-layered web can be wound into a roll under compression such that the web is in a collapsed state in the roll and expands to an expanded state when unwound from the roll.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a cross-sectional view of one embodiment of a multi-layered web made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to multi-layered webs that are not only soft and have excellent absorbency properties, but are also resilient. In particular, the multi-layered web has Z-direction resiliency by incorporating into the web a resilient, fibrous middle layer that when compressed will bounce back to substantially its original thickness.

The multi-layered web of the present disclosure provides various advantages and benefits. For instance, the multi-layered web is particularly well suited to producing rolled products. The web, for instance, can be rolled under tension and can assume a collapsed state within the roll. In this manner, the roll of material can be tightly wound and can hold a significant amount of sheets. When unwound, however, and tension is released, the resilient middle layer will return to its original form and structure providing an enhanced hand drying or wiping experience. For example, the resilient middle layer provides significant void volume for the absorption of water for drying surfaces and the hands of a user. The resilient or elastic nature of the middle layer also gives the multi-layered web a soft and unique feel. Thus, the multi-layered web of the present disclosure is not only capable of producing high capacity rolls but is also capable of providing the end user with a positive hand dry or wiper experience.

The resilient and/or elastic middle layer of the multi-layered web can be formed from various different types of fibers. For instance, the middle layer can be formed from elastomeric fibers, three-dimensional fibers, debonded cellulosic fibers, and mixtures thereof. The outer layers, on the other hand, of the web can be made from pulp fibers to give the wiper the appearance and surface feel of a conventional tissue product, such as a bath tissue, a paper towel, an industrial wiper, or the like. In order to form the multi-layered web having distinct layers of dissimilar materials with resilient properties, the web is generally not capable of being formed through conventional wet laying processes. Instead, the multi-layered web can be formed through processes that use gases alone or gases mixed with water to form the individual layers into a coherent web. In one embodiment, for instance, the web can be formed according to an air laying process or a multi-phase process, such as a foam-forming process.

Referring to FIG. 1, for exemplary purposes only, one embodiment of a multi-layered web 10 made in accordance with the present disclosure is shown. As illustrated, the multi-layered web 10 includes distinct fibrous layers made from different materials. The multi-layered web 10, for instance, can include a first layer 12 spaced from a second layer 14. The first layer 12, for instance, may comprise a top surface layer while the second layer 14 may comprise a bottom surface layer. Positioned inbetween the first layer 12 and the second layer 14 is at least one middle layer 16. In accordance with the present disclosure, the middle layer 16 is a resilient and optionally elastic fibrous layer.

The first layer 12 and the second layer 14 can be made from the same type of fibers or can be made from different types of fibers. In one embodiment, the first layer 12 and the second layer 14 contain pulp fibers. Suitable fibers for forming the first layer 12 and the second layer 14 include any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods. Fibers prepared from organosolv pulping methods can also be used.

A portion of the fibers, such as up to 50% or less by dry weight, or from about 5% to about 30% by dry weight, can be synthetic fibers such as rayon, polyolefin fibers, polyester fibers, bicomponent sheath-core fibers, multi-component binder fibers, and the like. Synthetic cellulose fiber types include rayon in all its varieties and other fibers derived from viscose or chemically-modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. Recycled fibers or virgin fibers may be used. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

The first layer 12 and the second layer 14 can also be formed without a substantial amount of inner fiber-to-fiber bond strength. In this regard, the fiber furnish used to form the layers can be treated with a chemical debonding agent. Suitable debonding agents that may be used in the present disclosure include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents.

In one embodiment, the debonding agent used in the process of the present disclosure is an organic quaternary ammonium chloride and, particularly, a silicone-based amine salt of a quaternary ammonium chloride. For example, the debonding agent can be PROSOFT™ TQ1003, marketed by the Hercules Corporation. The debonding agent can be added to the fibers in an amount of from about 1 kg per metric tonne to about 10 kg per metric tonne of fibers.

In an alternative embodiment, the debonding agent can be an imidazoline-based agent. The imidazoline-based debonding agent can be obtained, for instance, from the Witco Corporation. The imidazoline-based debonding agent can be added in an amount of between 2.0 to about 15 kg per metric tonne.

The middle layer 16 is generally formed from a different mixture of fibers than that used to form the first layer 12 and the second layer 14. The fibers used to produce the middle layer 16 produce a resilient and/or elastic layer that can also provide the resulting web with a significant amount of void volume for absorbing liquids. In general, the middle layer 16 can be formed from elastomeric fibers, three-dimensional fibers, debonded cellulosic fibers, or mixtures thereof.

For example, in one embodiment, the middle layer 16 contains fibers made from an elastomeric polymer. As used herein, "elastomeric" is the property of a material that refers to its ability to extend when under a load and recover a significant portion of the load-induced extension after the load is removed. "Elastomeric" and "elastic" are used interchangeably to refer to a material that is generally capable of recovering its shape after deformation when the deforming force is removed. Specifically, as used herein, elastic or elastomeric is meant to be that property of any material which, upon application of an elongating force, permits the material to be stretchable to a stretched length which is at least about 25 percent greater than its relaxed unstretched length, and that will cause the material to recover at least 40 percent of its elongation upon release of the stretching force.

Materials suitable for use in preparing the thermoplastic elastomeric fibers herein include diblock, triblock, or multi-block elastomeric copolymers such as olefinic copolymers, including styrene-isoprene-styrene, styrene-butadiene-styrene, styrene-ethylene/butylene-styrene, or styrene-ethylene/propylene-styrene, which may be obtained under the trade designation KRATON® elastomeric resin; polyurethanes, including those available under the trade name LYCRA® polyurethane; polyamides, including polyether block amides available under the trade name PEBAX® polyether block amide; polyesters, such as those available under the trade name HYTREL® polyester; and single-site or metallocene-catalyzed polyolefins having density less than about 0.89 grams/cc, available under the trade name AFFINITY®.

A number of block copolymers can be used to prepare the thermoplastic elastomeric fibers. Such block copolymers generally comprise an elastomeric midblock portion and a thermoplastic endblock portion. The block copolymers generally have a three-dimensional physical crosslinked structure below the endblock portion glass transition temperature (T2) and are elastomeric. The block copolymers are also thermoplastic in the sense that they can be melted, formed, and resolidified several times with little or no change in physical properties (assuming a minimum of oxidative degradation).

One way of synthesizing such block copolymers is to polymerize the thermoplastic endblock portions separately from the elastomeric midblock portions. Once the midblock and endblock portions have been separately formed, they can be linked. Typically, midblock portions can be obtained by polymerizing di- and tri-unsaturated C4-C10 hydrocarbons such as, for example, dienes such as butadiene, isoprene, and the like, and trienes such as 1, 3, 5-heptatriene, and the like. When an endblock portion A is joined to a midblock portion B, an A-B block copolymer unit is formed, which unit can be coupled by various techniques or with various coupling agents C to provide a structure such as A-B-A, which is believed to comprise two A-B blocks joined together in a tail-to-tail A-B-C-B-A arrangement. By a similar technique, a radial block copolymer can be formed having the formula (A-B)nC, wherein C is the hub or central polyfunctional coupling agent and n is a number greater than 2. Using the coupling agent technique, the functionality of C determines the number of A-B branches.

Endblock portion A generally comprises a poly(vinylarene), such as polystyrene, having an average molecular weight between 1,000 and 60,000. Midblock portion B generally comprises a substantially amorphous polyolefin such as polyisoprene, ethylene/propylene polymers, ethylene/butylene polymers, polybutadiene, and the like, or mixtures thereof, having an average molecular weight between about 5,000 and about 450,000. The total molecular weight of the block copolymer is suitably about 10,000 to about 500,000 and more suitably about 200,000 to about 300,000. Any residual unsaturation in the midblock portion of the block copolymer can be hydrogenated selectively so that the content of olefinic double bonds in the block copolymers can be reduced to a residual proportion of less than 5 percent and suitably less than about 2 percent. Such hydrogenation tends to reduce sensitivity to oxidative degradation and may have beneficial effects upon elastomeric properties.

Suitable block copolymers comprise at least two substantially polystyrene endblock portions and at least one substantially ethylene/butylene mid-block portion. As an example, ethylene/butylene typically may comprise the major amount of the repeating units in such a block copolymer and can constitute, for example, 70 percent by weight or more of the block copolymer. The block copolymer can have three or more arms, and good results can be obtained with, for example, four, five, or six arms. The midblock portion can be hydrogenated, if desired.

Linear block copolymers, such as A-B-A, A-B-A-B-A or the like, are suitably selected on the basis of endblock content, large endblocks being preferred. For polystyrene-ethylene/butylene-polystyrene block copolymers, a styrene content in excess of about 10 weight percent is suitable, such as between about 12 to about 30 weight percent. With higher styrene content, the polystyrene endblock portions generally have a relatively high molecular weight. A commercially available example of such a linear block copolymer is a styrene-ethylene/butylene-styrene block copolymer which contains about 13 weight percent styrene units and essentially the balance being ethylene/butylene units, commercially available under the trade designation KRATON® G1657 elastomeric resin. Typical properties of KRATON® G1657 elastomeric resin are reported to include a tensile strength of 3400 pounds per square inch (2×106 kilograms per square meter), a 300 percent modulus of 350 pounds per square inch (1.4×105 kilograms per square meter), an elongation of 750 percent at break, a Shore A hardness of 65, and a Brookfield viscosity, when at a concentration of 25 weight percent in a toluene solution, of about 4200 centipoise at room temperature. Another suitable elastomer, KRATON® G2740, is a styrene butadiene block copolymer blended with tackifier and low density polyethylene.

Other exemplary elastomeric materials which may be used include polyurethane (such as -(A-B)-n where A is a hard block and B is a rubber block) elastomeric materials such as, for example, those available under the trademark ESTANE® or MORTHANE®, polyetherester elastomeric materials such as, for example, those available under the trade designation HYTREL®, and those known as ARNITEL®.

The thermoplastic copolyetherester elastomers include copolyetheresters having the general formula:

accordance with ASTM D-2117. Another suitable material is a polyetherester block amide copolymer having the formula:

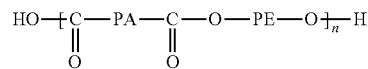

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235° C./1 Kg load); a modulus of elasticity in flexure of from about 20 MPa to about 200 MPa, as measured in accordance with ASTM D-790; a tensile strength at break of from about 29 MPa to about 33 MPa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235° C./1 Kg load); a modulus of elasticity in flexure of about 29.50 MPa, as measured in accordance with ASTM D-790; a tensile strength at break of about 29 MPa, as measured in accordance with ASTM D-639; and an elongation at break of about 650 percent as measured in accordance with ASTM D-638. Such materials are available in various grades under the trade designation PEBAX®.

Elastomeric polymers also include copolymers of ethylene and at least one vinyl monomer such as, for example, vinyl acetates, unsaturated aliphatic monocarboxylic acids, and esters of such monocarboxylic acids.

Other suitable elastomeric polymers include, without limitation, elastomeric (single-site or metallocene catalyzed) polypropylene, polyethylene and other alpha-olefin homopolymers and copolymers, having density less than about 0.89 grams/cc; ethylene vinyl acetate copolymers; and substantially amorphous copolymers and terpolymers of ethylene-propylene, butene-propylene, and ethylene-propylene-butene.

Single-site catalyzed elastomeric polymers (for example, constrained geometry or metallocene-catalyzed elastomeric polymers) may be used. The single-site process for making polyolefins uses a single-site catalyst which is activated (i.e., ionized) by a co-catalyst.

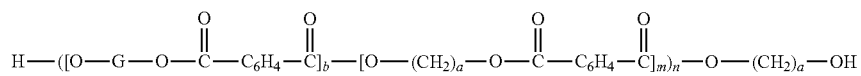

where "G" is selected from the group consisting of poly(oxyethylene)-alpha, omega-diol, poly(oxypropylene)-alpha,omega-diol, poly(oxytetra-methylene)-alpha,omega-diol and "a" and "b" are positive integers including 2, 4 and 6, "m" and "n" are positive integers including 1-20. Such materials generally have an elongation at break of from about 600 percent to 750 percent when measured in accordance with ASTM D-638 and a melt point of from about 350° F. to about 400° F. (176 to 205° C.) when measured in Polymers produced using single-site catalysts have a narrow molecular weight distribution. "Narrow molecular weight distribution polymer" refers to a polymer that exhibits a molecular weight distribution of less than about 3.5. As is known in the art, the molecular weight distribution of a polymer is the ration of the weight average molecular weight of the polymer to the number average molecular weight of the polymer. Methods of determining molecular weight distribution are described in the Encyclopedia of Polymer Science and Engineering, Volume 3, Pages 299-300 (1985).

Polydispersities (Mw/Mn) of below 3.5 and even below 2 are possible for single-site produced polymers. These polymers also have a narrow short chain branching distribution when compared to otherwise similar Ziegler-Natta produced polymers.

It is also possible to use a single-site catalyst system to control the isotacticity of the polymer quite closely when stereo selective metallocene catalysts are employed. In fact, polymers have been produced having an isotacticity in excess of 99 percent. It is also possible to produce highly syndiotactic polypropylene using this system.

Such polymers are available under the trade name EXX-POLL® for polypropylene based polymer and EXACT® for polyethylene based polymers or under the name ENGAGE®.

In an alternative embodiment, in addition to or instead of elastomeric fibers, the middle layer 16 may contain three-dimensional fibers. Three-dimensional fibers include, for instance, curled fibers, crimped fibers, and the like. Three-dimensional fibers can be formed from synthetic fibers or from natural fibers, such as cellulose fibers. In one embodiment, the three-dimensional fibers may be formed from an elastomeric polymer.

Natural fibers, for instance, can be curled or crimped through physical, chemical or mechanical means. The extent of curl incorporated into the fiber can be quantified through the Curl Index Test. As used herein, the term "Curl Index" is determined using an OpTest Fiber Quality Analyzer (FQA) from OpTest Equipment, Hawkesbury, Ontario, Canada Model No. Code LDA 96. Curled cellulose fibers that may be incorporated into the middle layer 16 of the multi-layered web of the present disclosure can generally have a curl index of greater than about 0.15, such as greater than about 0.18, such as greater than about 0.2, such as greater than about 0.22, such as greater than about 0.25 and generally less than about 0.4, such as less than about 0.3.

Synthetic fibers can be curled or crimped using various different techniques. In one embodiment, for instance, the fiber can be formed from a polymer or mixture of polymers that cause the fiber to curl or crimp when heat treated. In other embodiments, however, the synthetic fibers can be curled or crimped using chemical means or mechanical means. The three-dimensional synthetic fibers can include fibers that are curled in two dimensions and/or helically-shaped fibers.

In one embodiment, the three-dimensional fibers may comprise multi-component fibers, such as bi-component fibers. The bi-component fibers can contain dissimilar polymers in a side-by-side configuration or in an island-in-the-sea configuration. When heat treated or subjected to mechanical means, the presence of the two different polymers can cause the fibers to crimp or curl. The fibers, for instance, can be heat treated by traversal under a hot air knife or hot air diffuser. Crimping can result due to differential cooling of the polymer components of the fibers. After the fibers are crimped or curled, the fibers can optionally be subjected to a further heat treating step in order to lock in the three-dimensional conformation. The synthetic fibers can be made from all different types of polymers including polyolefin polymers such as polyethylene and/or polypropylene, polyester polymers, polyamide polymers, and the like. In one embodiment, the synthetic fibers are bi-component fibers made from a polyethylene and a polypropylene. In one embodiment, the polyethylene may have greater crystallinity which causes the polyethylene chains to recrystallize upon cooling and results in the polyethylene polymer shrinking and inducing crimp or curl into the fiber.

Other multi-component fibers that may be used in accordance with the present disclosure include bi-component fibers having a sheath-core configuration in which a polyethylene polymer is used to form the sheath while the core is made from a polyester polymer, such as a polyethylene terephthalate polymer. Many of the above described bi-component fibers also can be used as binding fibers if desired. When subjected to a certain amount of thermal energy, for instance, the sheath polymer on one fiber can bond to the sheath polymer on an adjacent fiber. Interfiber bonding may further increase the elasticity or resiliency of the middle layer.

In another embodiment, the middle layer may contain debonded fibers. The debonded fibers can be present alone or in combination with three-dimensional fibers and/or elastomeric fibers. Debonded fibers, for instance, can include cellulose fibers treated with a debonding agent as described above. The cellulose fibers may comprise pulp fibers, plant-based fibers, or regenerated cellulose fibers.

In an alternative embodiment, the debonded fibers include alpha cellulose fibers. Alpha cellulose fibers are fibers that contain low amounts of hemicellulose which is responsible for hydrogen bonding. Alpha cellulose fibers are commercially available from numerous sources including Yak Papermill.

The fibers contained in the middle layer 16 of the multi-layered web 10 can have various different fiber lengths. In general, the fibers have a length of greater than about 5 mm. For instance, the fibers can have a length of greater than about 6 mm, such as greater than about 10 mm, such as greater than about 15 mm, such as greater than about 20 mm, such as greater than about 25 mm, such as greater than about 30 mm, such as greater than about 35 mm, such as greater than about 40 mm. The fibers generally have a length of less than about 300 mm, such as less than about 200 mm, such as less than about 100 mm.

The relative weights between the middle layer 16 and the first layer 12 and second layer 14 can vary depending upon various factors including the product being formed, the type of fibers used to make the product, and the desired final properties of the web. In general, the middle layer is at least about 10% by weight, such as at least about 15% by weight, such as least about 20% by weight, such as at least about 25% by weight, such as at least about 30% by weight, such as at least about 35% by weight, such as at least about 40% by weight, such as at least about 45% by weight of the multi-layered web. The middle layer is generally less than about 60% by weight of the web, such as less than about 50% by weight of the web, such as less than about 40% by weight of the web, such as less than about 35% by weight of the web. The first layer 12 and the second layer 14 can generally be made from the same fibers in the same amounts or can vary. The first layer 12 and the second layer 14, for instance, can independently comprise greater than about 15% by weight of the web, such as greater than about 20% by weight of the web, such as greater than about 25% by weight of the web, such as greater than about 30% by weight of the web, such as greater than about 35% by weight of the web and generally less than about 45% by weight of the web, such as less than about 40% by weight of the web, such as less than about 35% by weight of the web, such as less than about 30% by weight of the web.

The basis weight of the multi-layered web can also vary depending upon the type of product being produced. In general, the basis weight of the multi-layered web is greater than about 10 gsm, such as greater than about 15 gsm, such as greater than about 20 gsm, such as greater than about 25 gsm, such as greater than about 30 gsm and generally less than about 150 gsm, such as less than about 120 gsm, such as less than about 100 gsm, such as less than about 80 gsm, such as less than about 60 gsm, such as less than about 50 gsm, such as less than about 45 gsm.

The process and techniques used for producing the multi-layered web can vary depending upon the particular application. In general, any process may be used to form the web that is capable of forming a web with distinct layers and capable of processing the different fibers used to produce the web. In particular, a process is to be selected that can not only process synthetic fibers, such as elastomeric fibers, three-dimensional fibers and the like but also can produce a middle layer with the desired resiliency and/or elastic properties. Various techniques that can be used to produce the multi-layered web include multi-phase forming, air forming, bonded carded processes, and combinations thereof.

In one embodiment, for instance, the multi-layered web is produced through a multi-phase forming process, such as a foam-forming process. For example, in one embodiment, a foam is first formed by combining water with a foaming agent. The foaming agent, for instance, may comprise any suitable surfactant. In one embodiment, for instance, the foaming agent may comprise sodium lauryl sulfate, which is also known as sodium dodecyl sulfate. Other foaming agents include sodium lauryl ether sulfate or ammonium lauryl sulfate. In other embodiments, the foaming agent may comprise any suitable cationic and/or amphoteric surfactant. For instance, other foaming agents include fatty acid amines, amides, amine oxides, fatty acid quaternary compounds, and the like.

The foaming agent is combined with water generally in an amount greater than about 10 ppm, such as greater than about 50 ppm, such as greater than about 100 ppm, such as greater than about 200 ppm, such as greater than about 300 ppm, such as greater than about 400 ppm, such as greater than about 500 ppm, such as greater than about 600 ppm, such as greater than about 700 ppm. One or more foaming agents are generally present in an amount less than about 15% by weight, such as in an amount less than about 10% by weight, such as in an amount less than about 5% by weight, such as in an amount less than about 1% by weight.

Once the foaming agent and water are combined, the mixture is blended or otherwise subjected to forces capable of forming a foam. A foam generally refers to a porous matrix, which is an aggregate of hollow cells or bubbles which may be interconnected to form channels or capillaries.

The foam density can vary depending upon the particular application and various factors including the fiber furnish used. In one embodiment, for instance, the foam density of the foam can be greater than about 200 g/L, such as greater than about 250 g/L, such as greater than about 300 g/L. The foam density is generally less than about 600 g/L, such as less than about 500 g/L, such as less than about 400 g/L, such as less than about 350 g/L. In one embodiment, for instance, a lower density foam is used having a foam density of generally less than about 350 g/L, such as less than about 340 g/L, such as less than about 330 g/L. The foam will generally have an air content of greater than about 40%, such as greater than about 50%, such as greater than about 60%. The air content is generally less than about 75% by volume, such as less than about 70% by volume, such as less than about 65% by volume.

In order to form the multi-layered tissue web, the foam is combined with each fiber furnish that is used to form the first layer 12, the second layer 14, and the middle layer 16. Depending upon the fiber furnish of the first layer and the second layer, two or three different foam suspensions are formed. Each foam suspension of fibers is then pumped to a tank and from the tank fed to at least one headbox. For instance, a single headbox may be used that can keep the different fiber suspensions separated and ejected onto a forming surface in a stratified pattern. In an alternative embodiment, multiple headboxes may be used that are each used to form a different layer in the resulting web.

In one embodiment, the different layers are fed onto a forming fabric so as to form the multi-layered web and conveyed downstream and dewatered. For instance, the process can include a plurality of vacuum devices, such as vacuum boxes and vacuum rolls for removing water. In addition, the newly formed web can also be placed in communication with a steam box above a pair of vacuum rolls for increasing dryness.

Using a foam-forming process can provide various advantages and benefits depending upon the particular application. For example, foam-forming processes are capable of processing all the different fiber types that may be used to form the resilient, middle layer of the multi-layered web. Foam-forming processes also allow for a foam structure and rheology that can be varied in order to vary the final density of the product. Various different surfactants can be used also to vary the bubble size distribution of the foam and the resulting properties of the web. Not only do foam-forming processes allow for the processing of relatively long synthetic fibers, but foam-forming also produces larger pores compared to that of wet laid sheets which can provide an optimum pore size distribution that increases absorbency of the web later. Foam-forming also produces unique compression behavior in the thickness direction due to the amount of bulk that can be incorporated into the formed web. For instance, the web can have a long initial rise compression load and high strain recovery after compression due to fiber reorientation during compression. Another benefit to using foam-forming as opposed to a wet laid process is the ability of the foam-forming process to displace liquid water from a porous medium. In this manner, the multi-layered web may have enhanced dewatering by the use of agents that lower the surface tension of the saturating liquid.

Yet another advantage to using a foam-forming process is the ability to orient the fibers in a layer when producing the multi-layered web. Foam-forming not only allows for the fibers to be oriented but also allows a different fiber orientation depending upon the different layers contained in the resulting web. For example, in one embodiment, the middle layer 16 can include fibers oriented in a first direction, while the fibers contained in the first layer 12 and the second layer 14 can be oriented in a second direction. The first direction can be different or skew to the second direction. For instance, in one embodiment, the first direction can be perpendicular to the second direction. In one embodiment, the fibers in the first layer 12 and the second layer 14 can be oriented in the machine direction, while the fibers contained in the middle layer 16 can be oriented in the cross direction or vice versus.

Fiber orientation can be determined by comparing within a particular layer the orientation of the fibers in one direction in comparison to the orientation of the fibers in a perpendicular direction. For instance, a layer that has fibers oriented in the machine direction or the length direction can display a machine direction to cross machine direction ratio of greater than 1. Similarly, a layer that has fibers oriented in the cross machine direction can display a machine direction to cross machine direction ratio of less than 1. In one embodiment, greater than 50%, such as greater than 60% of the fibers in a layer can be oriented in a single direction.

Orienting the fibers in the middle layer in a different direction than the fibers in the first layer or the second layer can provide various advantages and benefits. Orienting the fibers in different directions, for instance, can further maintain the different layers as distinct, and with little to no intermingling within the resulting web. The different fiber orientation may further optimize the resiliency properties of the middle layer in comparison to the properties of the first layer and the second layer.

Once the multi-layered web is formed, the web can be dried using any suitable process in order to further enhance the properties of the web. The web can be dried, for instance, by feeding the web through a dryer, placing the web adjacent to a heated dryer drum, or by forcing hot gases through the web. For instance, in one embodiment, the web can be through-air dried.

In order to further increase the bulk of the multi-layered web and/or to further enhance the resilient properties of the web, the web can also be fed through various different downstream processes. For instance, in one embodiment, the web can be subjected to a rush transfer process while the web is being made. For instance, the web can be transferred from a first fabric, such as a forming fabric, to a second fabric, such as a transfer fabric. In one embodiment, the transfer fabric can be traveling at a slower speed than the forming fabric in order to impart increased stretch into the web. Rush transfer can also increase the void volume of the web.

Alternatively, rush transfer can occur from the transfer fabric to a dryer fabric, such as a throughdrying fabric. The throughdrying fabric can be traveling at a slower speed relative to the transfer fabric for causing rush transfer to occur.

In still another embodiment, the multi-layered web can be placed against a three-dimensional fabric during formation in order to impart a design or pattern into the web. For example, in one embodiment, the multi-layered web can be placed on a throughdrying fabric containing impression knuckles which are raised at least about 0.005 inches above the plane of the fabric. During drying, the side of the web facing the fabric can be macroscopically arranged to conform to the surface of the fabric to form a three-dimensional surface.

In still another embodiment, the multi-layered web can be creped. For instance, in one embodiment, the multi-layered web can be adhered to a creping surface, such as a Yankee dryer using an adhesive. An adhesive, for instance, can be sprayed onto the surface of the dryer for adhering the web to the surface of the dryer. The web then rotates into contact with a creping doctor blade which crepes the web from the surface of the drum. In one embodiment, only one side of the multi-layered web is creped. In an alternative embodiment, however, both sides of the web can each be creped as described above.

In an alternative creping process, an adhesive may be applied to the surface of the web instead of the surface of the dryer. In this embodiment, for instance, an adhesive can be applied to one side of the web according to a pattern. The web is then adhered to the creping surface and creped from the surface.

Creping the multi-layered web may further improve the resilient properties of the web. Creping the web, for instance, can further impart tension into the web between the outer layer that is creped and the middle layer. This tension differential may further improve the resilient properties of the middle layer when the web is compressed and then released.

The multi-layered web made in accordance with the present disclosure is formed with an excellent balance of properties. The outer layers of the web, for instance, can be formed from pulp fibers and therefore can provide the web with the feel of a conventional tissue product, such as a bath tissue, a facial tissue, a paper towel, an industrial wiper, or the like. The fibers used to form the outer layer are also water absorbent and readily wick away moisture from an adjacent surface, such as one's hands. The multi-layered web of the present disclosure also has resiliency and/or elasticity in the Z-direction. The resilient middle layer, for instance, provides significant void volume for absorption of water, while being resilient to compressive forces. When the web is compressed and then the tension is released, the resilient middle layer will return to its original form and structure providing an enhanced wiping experience.

The resiliency of the middle layer can be measured using various different tests. For example, in one embodiment, the resiliency of the multi-layered web can be measured through bulk recovery. The sheet "bulk" is calculated as the quotient of the caliper of a dry tissue sheet, expressed in microns, divided by the dry basis weight, expressed in grams per square meter. The resulting sheet bulk is expressed in cubic centimeters per gram. More specifically, the caliper is measured as the total thickness of a stack of ten representative sheets and dividing the total thickness of the stack by ten, where each sheet within the stack is placed with the same side up. Caliper is measured in accordance with TAPPI test method T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second.

In order to measure bulk recovery, an increased compressive force can be placed against the stack of sheets and the bulk can be measured while the compressive force is being placed on the sheets and after the compressive force has been removed. For example, the test above for calculating bulk can be used in which the 2.0 kPa load can be increased to 13 kPa. The caliper of the stack can be measured while under the 13 kPa load. The load can then be reduced to 2 kPa and the caliper can be measured again to determine bulk and thickness recovery. This test can be repeated three times and an average can be used as the final result.

When the compressive force is removed, for instance, webs made according to the present disclosure will increase in bulk by at least about 5%, such as at least about 10%, such as at least about 15%, such as at least about 20%, such as at least about 25%, such as at least about 30%. The bulk, for instance, will increase in an amount up to about 90%, such as in an amount up to about 80%, such as in an amount up to about 70%.

During the above test, the caliper or thickness of the web can also be measured while the webs are compressed and after the compressive force has been removed. After the compressive force is removed, for instance, the web can increase in thickness by at least about 5%, such as at least about 8%, such as at least about 10% and generally in an amount less than about 80%, such as less than about 50%.

As described above, the multi-layered web of the present disclosure can be used in numerous applications. In one embodiment, for instance, the web can be cut into individual sheets and packaged. For example, in one embodiment, the individual sheets can be interfolded for being dispensed one at a time.

The multi-layered product of the present disclosure, however, is particularly well suited to forming spirally wound products. Because of the resilient properties of the web, for instance, the multi-layered web can be wound into rolls under tension causing the web to compress. In this manner, spirally wound rolls can contain maximum amounts of the sheet product without damaging the softness or absorbency properties of the web. For example, the multi-layered web can be wound into a roll under compression such that the web is in a collapsed state in the roll. When unwound from the roll, however, the multi-layered web can expand to an expanded state for use as a wiping product. For example, when unwound, the multi-layered web can increase in thickness and/or bulk in an amount greater than about 5%, such as in an amount greater than about 8%, such as in an amount greater than about 10%, such as in an amount greater than about 12%, such as in an amount greater than about 15% and generally in an amount less than about 70%.

The amount of tension placed on each ply of product in the spirally wound product can vary depending upon the particular application. In one embodiment, for instance, the multi-layered web can be rolled into a sheet such that the inter-layer pressure within the roll is greater than about 0.3 psi, such as greater than about 0.4 psi, such as greater than about 0.5 psi, such as greater than about 0.6 psi, such as greater than about 0.7 psi, such as greater than about 0.8 psi, such as greater than about 0.9 psi, such as greater than about 1 psi and generally less than about 2 psi, such as less than about 2.5 psi.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An absorbent, multi-layered web comprising:
a first layer comprising pulp fibers;
a second layer comprising pulp fibers; and
a middle layer positioned in between the first layer and the second layer, the middle layer comprising a resilient fibrous layer, the resilient fibrous layer comprising elastomeric fibers, three-dimensional fibers, debonded cellulosic fibers, or mixtures thereof, wherein the middle layer contains the three-dimensional fibers, wherein the three-dimensional fibers comprise curled fibers, the curled fibers having a curl index of greater than about 0.15, wherein the three-dimensional fibers comprise multi-component fibers, wherein the multi-component fibers comprise interfiber bonds.

2. An absorbent, multi-layered web as defined in claim 1, wherein, when the web is subjected to a compressive force of 13 kPa and the compressive force is removed, the web increases in thickness in an amount of at least about 5%.

3. An absorbent, multi-layered web as defined in claim 1, wherein, when the web is subjected to a compressive force of 13 kPa and the compressive force is removed, the web increases in bulk in an amount of at least about 5%.

4. An absorbent, multi-layered web as defined in claim 1, wherein the middle layer further comprising the elastomeric fibers, the elastomeric fibers being formed from an elastomeric polymer, the elastomeric polymer selected from the group consisting of a styrenic block copolymer, a thermoplastic polyurethane elastomer, a polyamide elastomer, a copolyester elastomer, a metallocene catalyzed polyolefin elastomer, or a silicone elastomer.

5. An absorbent, multi-layered web as defined in claim 1, wherein the three-dimensional fibers comprise synthetic bi-component fibers.

6. An absorbent, multi-layered web as defined in claim 1, wherein the three-dimensional fibers comprise helically-shaped fibers.

7. An absorbent, multi-layered web as defined in claim 1, wherein the middle layer further comprising the debonded cellulosic fibers.

8. An absorbent, multi-layered web as defined in claim 7, wherein the debonded cellulosic fibers comprise alpha cellulose fibers or cellulose fibers treated with a debonding agent.

9. An absorbent, multi-layered web as defined in claim 1, wherein greater than about 50% of the fibers in the middle layer are oriented in a first direction and wherein greater than about 50% of the fibers in the first layer and greater than about 50% of the fibers in the second layer are oriented in a second direction.

10. An absorbent, multi-layered web as defined in claim 9, wherein the first direction is perpendicular to the second direction.

11. An absorbent, multi-layered web as defined in claim 1, wherein the web has been creped on at least one side.

12. An absorbent, multi-layered web as defined in claim 1, wherein the web comprises a multi-phase formed web.

13. An absorbent, multi-layered web as defined in claim 1, wherein the middle layer comprises from about 10% by weight to about 60% by weight of the multi-layered web.

14. An absorbent, multi-layered web as defined in claim 1, wherein the web has a basis weight of from about 10 gsm to about 150 gsm.

15. An absorbent, multi-layered web as defined in claim 1, wherein the first layer and the second layer both further contain synthetic fibers.

16. An absorbent, multi-layered web as defined in claim 1, wherein the first layer comprises a top surface layer and the second layer comprises a bottom surface layer.

17. An absorbent, multi-layered web as defined in claim 1, wherein the web contains a foam-forming surfactant.

18. An absorbent, multi-layered web as defined in claim 1, wherein the web is a single ply article.

* * * * *